US011346563B2

(12) United States Patent
Nikaido et al.

(10) Patent No.: US 11,346,563 B2
(45) Date of Patent: May 31, 2022

(54) HEAT SOURCE SYSTEM CONTROLLING DEVICE, HEAT SOURCE SYSTEM, HEAT SOURCE SYSTEM CONTROLLING METHOD, AND HEAT SOURCE SYSTEM CONTROLLING PROGRAM

(71) Applicants: MITSUBISHI HEAVY INDUSTRIES THERMAL SYSTEMS, LTD., Tokyo (JP); TOKYO ELECTRIC POWER COMPANY HOLDINGS, INCORPORATED, Tokyo (JP)

(72) Inventors: Satoshi Nikaido, Tokyo (JP); Koki Tateishi, Tokyo (JP); Yusuke Hazui, Tokyo (JP); Yutaka Takenaka, Tokyo (JP); Hirotaka Hanasaki, Tokyo (JP); Satoru Tanaka, Tokyo (JP)

(73) Assignees: MITSUBISHI HEAVY INDUSTRIES THERMAL SYSTEMS, LTD., Tokyo (JP); TOKYO ELECTRIC POWER COMPANY HOLDINGS, INCORPORATED, Tokyo (JP)

(*) Notice: Subject to any disclaimer, the term of this patent is extended or adjusted under 35 U.S.C. 154(b) by 539 days.

(21) Appl. No.: 16/339,106

(22) PCT Filed: Sep. 20, 2017

(86) PCT No.: PCT/JP2017/033836
§ 371 (c)(1),
(2) Date: Apr. 3, 2019

(87) PCT Pub. No.: WO2018/066357
PCT Pub. Date: Apr. 12, 2018

(65) Prior Publication Data
US 2020/0041144 A1 Feb. 6, 2020

(30) Foreign Application Priority Data
Oct. 6, 2016 (JP) .............................. JP2016-198199

(51) Int. Cl.
*F24D 19/10* (2006.01)
*F24D 5/12* (2006.01)

(52) U.S. Cl.
CPC ........... *F24D 19/1087* (2013.01); *F24D 5/12* (2013.01); *F24D 2200/123* (2013.01); *F24D 2200/126* (2013.01)

(58) Field of Classification Search
USPC ........................................................ 237/2 b
See application file for complete search history.

(56) References Cited

U.S. PATENT DOCUMENTS

2011/0114284 A1* 5/2011 Siegenthaler ........... F24T 10/00
165/45

FOREIGN PATENT DOCUMENTS

JP      2001-221541 A    8/2001
JP      2010-127559 A    6/2010
(Continued)

OTHER PUBLICATIONS

International Search Report for International Application No. PCT/JP2017/033836, dated Nov. 28, 2017, with English translation.
(Continued)

*Primary Examiner* — Steven B McAllister
*Assistant Examiner* — John E Bargero
(74) *Attorney, Agent, or Firm* — Birch, Stewart, Kolasch & Birch, LLP

(57) ABSTRACT

A superordinate controlling device for a heat source system (1) including a plurality of heat sources, the superordinate controlling device being applied to the heat source system (1) and controlling heat-pump type chillers (2a) and (2b) and absorption-type chillers (2c) and (2d) in such a manner that a heat transfer medium leaving temperature that is the temperature of a heat transfer medium supplied to an exter-
(Continued)

nal load (6) is equal to a setting temperature. The heat-pump type chillers (2*a*) and (2*b*) each have a higher Coefficient of Performance (COP) than that of each of the absorption-type chillers (2*c*) and (2*d*). The superordinate controlling device includes a heat transfer medium leaving temperature changing means for carrying out heat transfer medium leaving temperature control, by changing the heat transfer medium leaving temperatures of the heat-pump type chillers (2*a*) and (2*b*), when a post-change prediction value of each of the absorption-type chiller (2*c*) and (2*d*) predicted based on a supposition that the heat transfer medium leaving temperatures of the heat-pump type chillers (2*a*) and (2*b*) are changed exceeds a second underload stop threshold value at which the corresponding one of the absorption-type chiller (2*c*) and (2*d*) would have an underload stop.

20 Claims, 6 Drawing Sheets

(56) References Cited

FOREIGN PATENT DOCUMENTS

| | | |
|---|---|---|
| JP | 2012-57865 A | 3/2012 |
| JP | 2013-160415 A | 8/2013 |
| JP | 2016-6355 A | 1/2016 |
| JP | 2016-44952 A | 4/2016 |

OTHER PUBLICATIONS

Written Opinion of the International Searching Authority for International Application No. PCT/JP2017/033836, dated Nov. 28, 2017, with English translation.

\* cited by examiner

HEAT SOURCE SYSTEM CONTROLLING DEVICE, HEAT SOURCE SYSTEM, HEAT SOURCE SYSTEM CONTROLLING METHOD, AND HEAT SOURCE SYSTEM CONTROLLING PROGRAM

TECHNICAL FIELD

The present invention is related to a heat source system controlling device, a heat source system, a heat source system controlling method, and a heat source system controlling program that are capable of avoiding underload stops and overload operations.

BACKGROUND ART

A complex heat source system that is conventionally known is structured with one or more heat source machines each having a higher Coefficient of Performance (COP) among heat source machines and one or more other heat source machines each having a lower COP than that of the aforementioned heat source machines. In such a complex heat source system, an endeavor is made to improve the COP of the entire heat source system, by increasing the amount of heat generated by the heat source machines having the higher COP and decreasing the amount of heat generated by the heat source machine having the lower COP.

For example, Patent Literature 1 discloses using a heat-pump type chiller having a higher COP as a base heat source and lowering a setting value for the chilled water leaving temperature of the heat-pump type chiller while an absorption-type chiller having a lower COP is in operation. Although the invention disclosed in Patent Literature 1 is related to an air-cooling operation, the invention is also applicable to an air-heating operation.

CITATION LIST

Patent Citation

Patent Citation 1: Japanese Unexamined Patent Application, Publication No. 2016-44952

DISCLOSURE OF INVENTION

Technical Problem

According to the invention disclosed in Patent Citation 1, however, a problem arises where there is a possibility that one or more of the heat source machines may stop because the heat source machines may have an underload or overload operation as a result of changing the setting value for the chilled/heated water leaving temperature during the air-cooling operation or the air-heating operation.

For example, during an air-cooling operation, when the setting value for the chilled water leaving temperature is rapidly lowered in a step-like manner, there is a possibility that the absorption-type chiller may have an underload stop because the chilled water leaving temperature of the absorption-type chiller having the lower COP becomes lower or because the load on the absorption-type chiller becomes lower due to the rapid drop of the chilled water entering temperature. The cause of the underload stop in this situation is considered to be a difference in the responding speeds between the heat-pump type chiller and the absorption-type chiller in response to the rapid change in the generated amount of heat caused by the change made to the setting for the chilled water leaving temperature. Generally speaking, absorption-type chillers respond more slowly than heat-pump type chillers. It is therefore difficult to suddenly change capabilities of absorption-type chillers.

Further, according to the invention disclosed in Patent Citation 1, the setting for the chilled water leaving temperature is returned to the original state when the chilled water entering temperature is equal to or lower than a predetermined value while the absorption-type chiller is not in operation. This arrangement, however, leads to a problem where there is a possibility that the heat-pump type chiller may have an underload stop due to the temperature difference being transiently small between the chilled water leaving temperature and the chilled water entering temperature because, in some situations, the setting value for the chilled water leaving temperature may be returned to the original state while the chilled water entering temperature is sufficiently low.

In view of the circumstances described above, it is an object of the present invention to provide a heat source system controlling device, a heat source system, a heat source system controlling method, and a heat source system controlling program that are capable of avoiding underload stops and overload operations.

Solution to Problem

To solve the problems described above, a heat source system controlling device, a heat source system, a heat source system controlling method, and a heat source system controlling program of the present invention adopt the following means:

A heat source system controlling device according to a first aspect of the present invention is applied to a heat source system including a plurality of heat sources and controls a first heat source machine and a second heat source machine in such a manner that a heat transfer medium leaving temperature, which is a temperature of a heat transfer medium supplied to an external load, is equal to a setting temperature, wherein the first heat source machine has a higher Coefficient of Performance (COP) than that of the second heat source machine, and the heat source system controlling device includes a heat transfer medium leaving temperature changing means for carrying out heat transfer medium leaving temperature control, by changing a heat transfer medium leaving temperature of the first heat source machine, when a post-change prediction value of the second heat source machine predicted based on a supposition that the heat transfer medium leaving temperature of the first heat source machine is changed exceeds a second underload stop threshold value at which the second heat source machine would have an underload stop.

According to this aspect, the heat transfer medium leaving temperature is changed when the post-change prediction value of the second heat source machine predicted based on the supposition that the heat transfer medium leaving temperature of the first heat source machine is changed is larger than the underload stop threshold value of the second heat source machine. The change in the operation state of the heat source system to be caused by the change in the heat transfer medium leaving temperature is predicted, so as to carry out the control to prevent the second heat source machine from having an underload stop. Accordingly, it is possible to change the heat transfer medium leaving temperature of the first heat source machine without the possibility of causing the second heat source machine to have an underload stop.

Further, it is possible to carry out load-distributed control based on efficiency levels (the COPs) of the heat source machines.

In addition, the heat transfer medium leaving temperature of the first heat source machine is not changed when it is determined that the second heat source machine would have an underload stop. Accordingly, it is possible to avoid the situation where the second heat source machine has an underload stop.

In this situation, the post-change prediction value may be the heat transfer medium leaving temperature, the heat transfer medium entering temperature, the load factor, or the like of the second heat source machine.

In the first aspect described above, it is desirable to have an arrangement in which the post-change prediction value is a heat transfer medium leaving temperature of the second heat source machine, and the second underload stop threshold value is a value based on the heat transfer medium leaving temperature of the second heat source machine.

According to this aspect, the heat transfer medium leaving temperature of the first heat source machine is changed when the heat transfer medium leaving temperature of the second heat source machine predicted based on the supposition that the heat transfer medium leaving temperature of the first heat source machine is changed is larger than the underload stop threshold value of the second heat source machine. The change in the heat transfer medium leaving temperature of the second heat source machine to be caused by the change in the heat transfer medium leaving temperature is predicted so as to carry out the control to prevent the second heat source machine from having an underload stop. It is therefore possible to change the heat transfer medium leaving temperature of the first heat source machine, without the possibility of causing the second heat source machine to have an underload stop.

In the first aspect described above, it is desirable to have an arrangement in which the post-change prediction value is a heat transfer medium entering temperature of the second heat source machine, and the second underload stop threshold value is a value based on the heat transfer medium entering temperature of the second heat source machine.

According to this aspect, the heat transfer medium leaving temperature of the first heat source machine is changed, when the heat transfer medium entering temperature of the second heat source machine predicted based on the supposition that the heat transfer medium leaving temperature of the first heat source machine is changed is larger than the underload stop threshold value of the second heat source machine. The change in the heat transfer medium entering temperature of the second heat source machine to be caused by the change in the heat transfer medium leaving temperature is predicted, so as to carry out the control to prevent the second heat source machine from having an underload stop. It is therefore possible to change the heat transfer medium leaving temperature of the first heat source machine, without the possibility of causing the second heat source machine to have an underload stop.

In the first aspect described above, it is desirable to have an arrangement in which the post-change prediction value is a load factor of the second heat source machine, and the second underload stop threshold value is a value based on the load factor of the second heat source machine.

According to this aspect, the heat transfer medium leaving temperature of the first heat source machine is changed, when the load factor of the second heat source machine predicted based on the supposition that heat transfer medium leaving temperature of the first heat source machine is changed is larger than the underload stop threshold value of the second heat source machine. The change in the load factor of the second heat source machine to be caused by the change in the heat transfer medium leaving temperature is predicted, so as to carry out the control to prevent the second heat source machine from having an underload stop. It is therefore possible to change the heat transfer medium leaving temperature of the first heat source machine, without the possibility of causing the second heat source machine to have an underload stop.

In this situation, the load factor of a heat source machine denotes a ratio of the output of the heat source machine to the rated output of the heat source machine.

In the first aspect described above, it is desirable to have an arrangement in which the heat transfer medium leaving temperature control is carried out when a time period during which the post-change prediction value of the second heat source machine exceeds the second underload stop threshold value is equal to or longer than a predetermined length of time.

According to this aspect, the post-change prediction value of the second heat source machine (i.e., the heat transfer medium leaving temperature of the second heat source machine, the heat transfer medium entering temperature of the second heat source machine, and the load factor of the second heat source machine) are each a value that transiently changes in accordance with changes in the heat source machines, the pumps, and the external load of the heat source system. For example, when the second heat source machine is an absorption chiller, the post-change prediction value keeps changing for a certain period of time after the absorption chiller is started up, because it takes time for the absorption chiller to exert the capability thereof. When the judging process is performed by using the post-change prediction value based on the value that keeps changing and the second underload stop threshold value, there is a possibility that it may not be possible to make an accurate judgment, because the post-change prediction value contains the transient fluctuations. When the judging process contains the transient fluctuations, unnecessary control would be carried out, and there is a possibility that not only the COP of the entire heat source system might be degraded, but also an underload stop might occur.

To cope with this situation, the heat transfer medium leaving temperature control is carried out, when the time period during which the post-change prediction value of the second heat source machine is larger than the second underload stop threshold value is equal to or longer than the predetermined length of time. With this arrangement, it is possible to avoid making a judgment that contains the transient fluctuations in the post-change prediction value. Further, it is possible to improve the COP of the entire heat source system and to avoid underload stops.

In the first aspect described above, it is desirable to have an arrangement in which the heat source system controlling device includes: the heat transfer medium leaving temperature changing means for carrying out the heat transfer medium leaving temperature control by returning the heat transfer medium leaving temperature of the first heat source machine to a pre-change value, when a load factor of the first heat source machine predicted based on a supposition that the heat transfer medium leaving temperature of the first heat source machine is returned to the pre-change value is smaller than a first underload stop threshold value at which the first heat source machine would have an underload stop.

According to this aspect, the heat transfer medium leaving temperature of the first heat source machine is returned to the pre-change value in advance, when the load factor of the first heat source machine predicted based on the supposition that the heat transfer medium leaving temperature of the first heat source machine is returned to the pre-change value is smaller than the underload stop threshold value of the first heat source machine. The change in the load factor of the first heat source machine to be caused by the change in the heat transfer medium leaving temperature is predicted so as to carry out the control to prevent the first heat source machine from having an underload stop. It is therefore possible to change the heat transfer medium leaving temperatures without the possibility of causing the first heat source machine to have an underload stop.

Further, the heat transfer medium leaving temperature is returned to the pre-change value in advance when it is determined that the first heat source machine would have an underload stop. It is therefore possible to avoid the situation where the first heat source machine has an underload stop.

In the first aspect described above, it is desirable to have an arrangement in which the heat transfer medium leaving temperature control is carried out when a time period during which the load factor of the first heat source machine predicted based on the supposition that the heat transfer medium leaving temperature of the first heat source machine is returned to the pre-change value is smaller than the first underload stop threshold value is equal to or longer than a predetermined length of time.

According to this aspect, the load factor of the first heat source machine predicted based on the supposition that the heat transfer medium leaving temperature of the first heat source machine is returned to the pre-change value is a value that transiently changes in accordance with changes in the heat source machines, the pumps, and the external load of the heat source system. When the judging process is performed by using the transiently-changing load factor of the first heat source machine predicted based on the supposition that the heat transfer medium leaving temperature of the first heat source machine is returned to the pre-change value and the first underload stop threshold value, there is a possibility that it may not be possible to make an accurate judgment, because the load factor of the first heat source machine predicted based on the supposition that the heat transfer medium leaving temperature of the first heat source machine is returned to the pre-change value contains the transient fluctuations. When the judging process contains the transient fluctuations, unnecessary control would be carried out, and there is a possibility that not only the COP of the entire heat source system might be degraded, but also an underload stop might occur.

To cope with this situation, the heat transfer medium leaving temperature control is carried out, when the time period during which the load factor of the first heat source machine predicted based on the supposition that the heat transfer medium leaving temperature of the first heat source machine is returned to the pre-change value is smaller than the first underload stop threshold value is equal to or longer than the predetermined length of time. With this arrangement, it is possible to avoid making a judgment that contains the transient fluctuations in the load factor of the first heat source machine predicted based on the supposition that the heat transfer medium leaving temperature of the first heat source machine is returned to the pre-change value. Further, it is possible to improve the COP of the entire heat source system and to avoid underload stops.

In the first aspect described above, it is desirable to have an arrangement in which the heat source system controlling device includes: the heat transfer medium leaving temperature changing means for carrying out the heat transfer medium leaving temperature control by changing the heat transfer medium leaving temperature of the first heat source machine, when a load factor of the first heat source machine predicted based on a supposition that the heat transfer medium leaving temperature of the first heat source machine is changed is smaller than a first overload threshold value at which the first heat source machine would have an overload operation.

According to this aspect, the heat transfer medium leaving temperature of the first heat source machine is changed, when the load factor of the first heat source machine predicted based on the supposition that the heat transfer medium leaving temperature of the first heat source machine is changed is smaller than the overload threshold value of the first heat source machine (i.e., the rated capacity of the first heat source machine). The change in the load factor of the first heat source machine to be caused by the change in the heat transfer medium leaving temperature is predicted so as to carry out the control to prevent the first heat source machine from having an overload operation. It is therefore possible to change the heat transfer medium leaving temperature without the possibility of causing the first heat source machine to have an overload operation.

Further, it is possible to carry out load-distributed control based on efficiency levels (COPs) of the heat source machines.

In addition, the heat transfer medium leaving temperature will not be changed when it is determined that the first heat source machine would have an overload operation. It is therefore possible to avoid overload operations of the first heat source machine.

In the first aspect described above, it is desirable to have an arrangement in which the heat transfer medium leaving temperature control is carried out when a time period during which the load factor of the first heat source machine predicted based on the supposition that the heat transfer medium leaving temperature of the first heat source machine is changed is smaller than the first overload threshold value is equal to or longer than a predetermined length of time.

According to this aspect, the load factor of the first heat source machine predicted based on the supposition that the heat transfer medium leaving temperature of the first heat source machine is changed is a value that transiently changes in accordance with changes in the heat source machines, the pumps, and the external load of the heat source system. When the judging process is performed by using the transiently-changing load factor of the first heat source machine predicted based on the supposition that the heat transfer medium leaving temperature of the first heat source machine is changed and the first overload threshold value, there is a possibility that it may not be possible to make an accurate judgment, because the load factor of the first heat source machine predicted based on the supposition that the heat transfer medium leaving temperature of the first heat source machine is changed contains the transient fluctuations. When the judging process contains the transient fluctuations, unnecessary control would be carried out, and there is a possibility that not only the COP of the entire heat source system might be degraded, but also an overload operation might occur.

To cope with this situation, the heat transfer medium leaving temperature control is carried out, when the time period during which the load factor of the first heat source machine predicted based on the supposition that the heat transfer medium leaving temperature of the first heat source machine is changed is smaller than the first overload threshold value is equal to or longer than the predetermined length of time. With this arrangement, it is possible to avoid making a judgment that contains the transient fluctuations in the load factor of the first heat source machine predicted based on the supposition that the heat transfer medium leaving temperature of the first heat source machine is changed. Further, it is possible to improve the COP of the entire heat source system and to avoid overload operations.

In the first aspect described above, it is desirable to have an arrangement in which the heat sources system controlling device includes: the heat transfer medium leaving temperature changing means for carrying out the heat transfer medium leaving temperature control by returning the heat transfer medium leaving temperature of the first heat source machine to the pre-change value, when the load factor of the first heat source machine observed in a state where the heat transfer medium leaving temperature of the first heat source machine has been changed exceeds the first overload threshold value at which the first heat source machine would have an overload operation.

According to this aspect, the heat transfer medium leaving temperature of the first heat source machine is changed to the pre-change value in advance, when the load factor of the first heat source machine observed in the state where the heat transfer medium leaving temperature of the first heat source machine has been changed is larger than the overload threshold value of the first heat source machine. Accordingly, the control is carried out to prevent the first heat source machine from having an overload operation. It is therefore possible to change the heat transfer medium leaving temperature without the possibility of causing the first heat source machine to have an overload operation.

Further, the heat transfer medium leaving temperature is returned to the pre-change value in advance when it is determined that the first heat source machine would have an overload operation. It is therefore possible to avoid overload operations of the first heat source machine.

In the first aspect described above, it is desirable to have an arrangement in which the heat transfer medium leaving temperature control is carried out when a time period during which the load factor of the first heat source machine observed in the state where the heat transfer medium leaving temperature of the first heat source machine has been changed exceeds the first overload threshold value is equal to or longer than a predetermined length of time.

According to this aspect, the load factor of the first heat source machine observed in the state where the heat transfer medium leaving temperature of the first heat source machine has been changed is a value that transiently changes in accordance with changes in the heat source machines, the pumps, and the external load of the heat source system. When the judging process is performed by using the transiently-changing load factor of the first heat source machine observed in the state where the heat transfer medium leaving temperature of the first heat source machine has been changed and the first overload threshold value, there is a possibility that it may not be possible to make an accurate judgment, because the load factor of the first heat source machine observed in the state where the heat transfer medium leaving temperature of the first heat source machine has been changed contains the transient fluctuations. When the judging process contains the transient fluctuations, unnecessary control would be carried out, and there is a possibility that not only the COP of the entire heat source system might be degraded, but also an overload operation might occur.

To cope with this situation, the heat transfer medium leaving temperature control is carried out, when the time period during which the load factor of the first heat source machine observed in the state where the heat transfer medium leaving temperature of the first heat source machine has been changed is larger than the first overload threshold value is equal to or longer than the predetermined length of time. With this arrangement, it is possible to avoid making a judgment that contains the transient fluctuations in the load factor of the first heat source machine observed in the state where the heat transfer medium leaving temperature of the first heat source machine has been changed. Further, it is possible to improve the COP of the entire heat source system and to avoid overload operations.

A heat source system according to a second aspect of the present invention includes the heat source system controlling device described in any one of the above sections.

A heat source system controlling method according to a third aspect of the present invention is applied to a heat source system including a plurality of heat sources and is used for controlling a first heat source machine and a second heat source machine in such a manner that a heat transfer medium leaving temperature, which is a temperature of a heat transfer medium supplied to an external load, is equal to a setting temperature, wherein the first heat source machine has a higher Coefficient of Performance (COP) than that of the second heat source machine, and the heat source system controlling method includes a heat transfer medium leaving temperature changing step of changing a heat transfer medium leaving temperature of the first heat source machine, when a post-change prediction value of the second heat source machine predicted based on a supposition that the heat transfer medium leaving temperature of the first heat source machine is changed exceeds a second underload stop threshold value at which the second heat source machine would have an underload stop.

A heat system controlling program according to a fourth aspect of the present invention is applied to a heat source system including a plurality of heat sources and is used for controlling a first heat source machine and a second heat source machine in such a manner that a heat transfer medium leaving temperature, which is a temperature of a heat transfer medium supplied to an external load, is equal to a setting temperature, wherein the first heat source machine has a higher Coefficient of Performance (COP) than that of the second heat source machine, and the heat source system controlling program includes a heat transfer medium leaving temperature changing step of changing a heat transfer medium leaving temperature of the first heat source machine, when a post-change prediction value of the second heat source machine predicted based on a supposition that the heat transfer medium leaving temperature of the first heat source machine is changed exceeds a second underload stop threshold value at which the second heat source machine would have an underload stop.

Advantageous Effects of Invention

According to the present invention, the heat transfer medium leaving temperature is changed after judging whether or not an underload stop or an overload operation may occur. It is therefore possible to avoid underload stops and overload operations.

DESCRIPTION OF EMBODIMENTS

Embodiments of a heat source system controlling device, a heat source system, a heat source system controlling method, and a heat source system controlling program of the present invention will be explained below, with reference to the drawings.

First Embodiment

A first embodiment of the present invention will be explained below, with reference to FIGS. 1 to 4.

Figure 1:
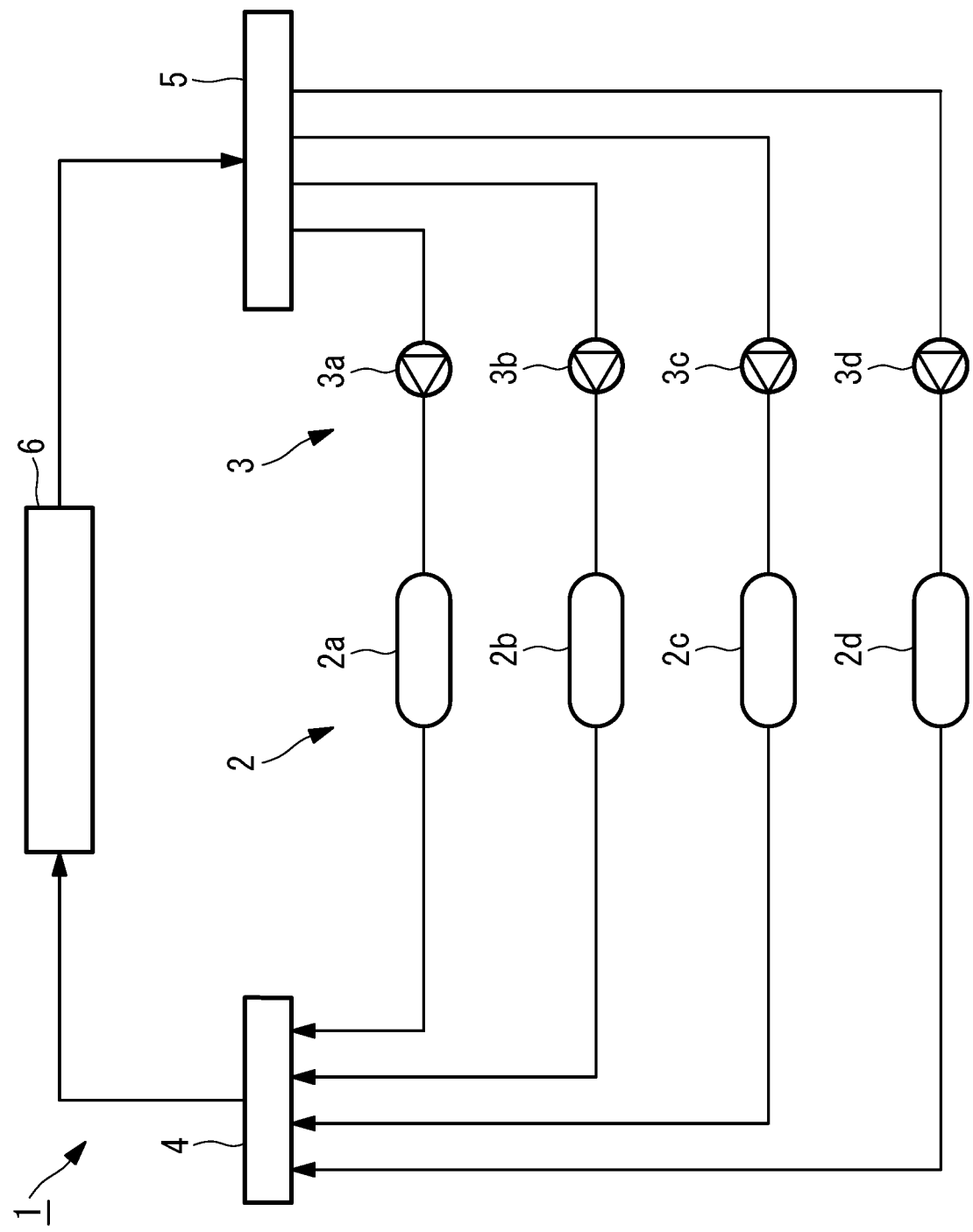
FIG. 1 is a schematic configuration diagram illustrating a heat source system of the present invention.

FIG. 1 illustrates a schematic configuration of a heat source system according to the present embodiment.

As illustrated in FIG. 1, a heat source system 1 includes, as primary constituent elements thereof, a heat source machine (a heat source) 2, pumps 3, a supply header 4, a return header 5, and an external load 6.

The heat source machine 2 is structured with heat-pump type chillers (first heat source machines) 2a and 2b and absorption-type chillers (second heat source machines) 2c and 2d. The heat-pump type chillers 2a and 2b and the absorption-type chillers 2c and 2d are each installed in parallel to the external load 6. Generally speaking, the heat-pump type chillers 2a and 2b are known to have a higher COP than the absorption-type chillers 2c and 2d.

The pumps 3 are structured with chilled water pumps 3a, 3b, 3c, and 3d.

Installed on the upstream side of the heat-pump type chillers 2a and 2b and the absorption-type chillers 2c and 2d in terms of a flow of chilled water (a heat transfer medium) observed while a cold heat output operation is performed are chilled water pumps 3a, 3b, 3c, and 3d that each pump out chilled water. The chilled water pumps 3a, 3b, 3c, and 3d forward chilled water from the return header 5 to the heat-pump type chillers 2a and 2b and to the absorption-type chillers 2c and 2d.

The chilled water routed through the heat-pump type chillers 2a and 2b and the absorption-type chillers 2c and 2d is collected in the supply header 4. The chilled water collected in the supply header 4 is supplied to the external load 6. After being supplied to an air-conditioner or the like at the external load 6 and being heated, the chilled water is forwarded to the return header 5. The chilled water is branched at the return header 5 and is forwarded, as described above, to the heat-pump type chillers 2a and 2b and to the absorption-type chillers 2c and 2d.

Figure 2:
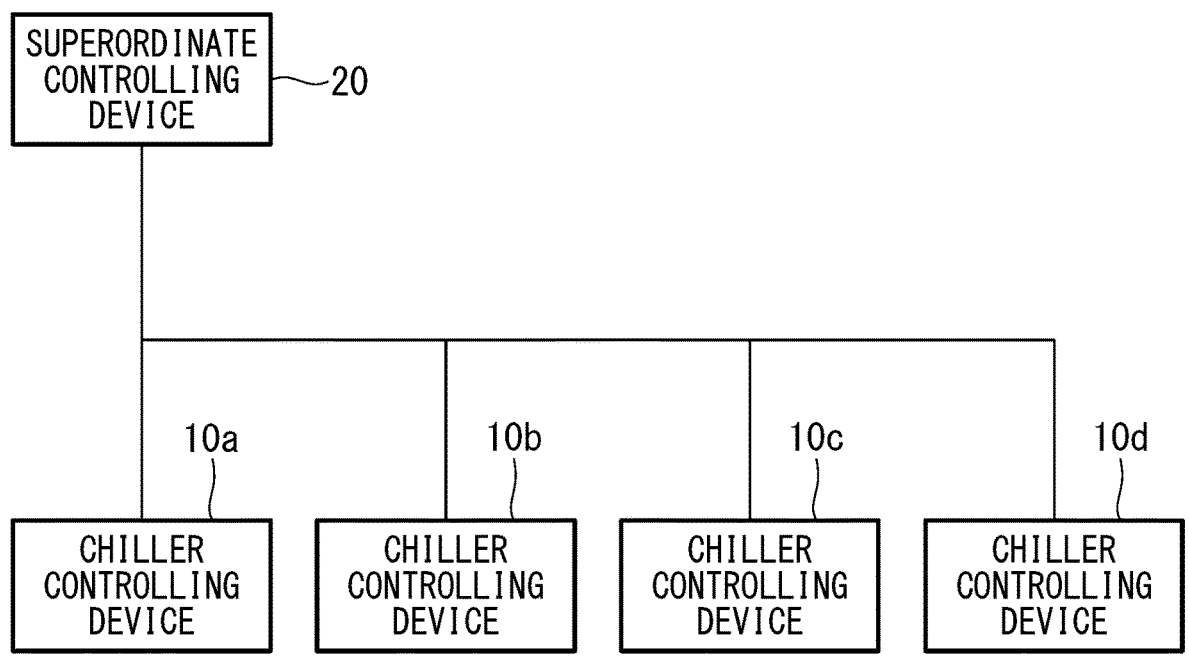
FIG. 2 is a block diagram illustrating controlling devices for the heat source system of the present invention.

FIG. 2 illustrates a block diagram illustrating heat source system controlling devices.

As illustrated in FIG. 2, chiller controlling devices 10a, 10b, 10c, and 10d serving as controlling devices of the heat-pump type chillers 2a and 2b and the absorption-type chillers 2c and 2d are connected to a superordinate controlling device 20. The superordinate controlling device 20 is, for example, a controlling device that controls the entirety of the heat source system 1, and controls rotation speeds or the like of the chilled water pumps 3a, 3b, 3c, and 3d, for example, in addition to controlling the heat-pump type chillers 2a and 2b and the absorption-type chillers 2c and 2d.

The superordinate controlling device 20 and the chiller controlling devices 10a, 10b, 10c, and 10d may be configured by using at least one Micro Processing Unit (MPU), for example, and include at least one computer-readable recording medium that has recorded thereon a program for executing various processes. As a result of a Central Processing Unit (CPU) reading and executing the program recorded on the recording medium into a main storage device configured with a Random Access Memory (RAM) or the like, the various processes are realized. Examples of the computer-readable recording medium include magnetic disks, optical magnetic disks, semiconductor memory elements, and the like.

The superordinate controlling device 20 and the chiller controlling devices 10a, 10b, 10c, and 10d may collectively be realized by using a single MPU or may each be realized by using an individual MPU.

Figure 3:
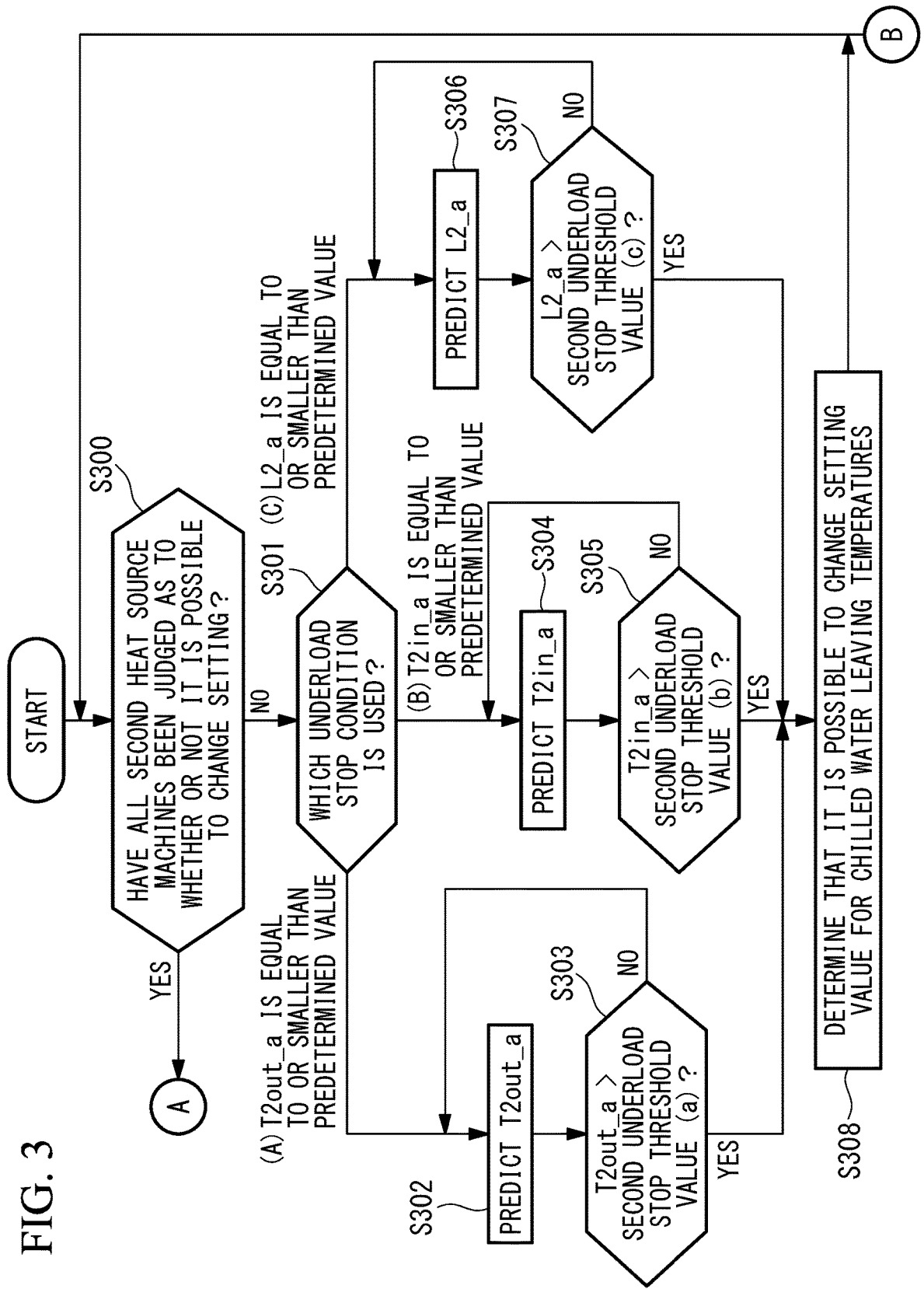
FIG. 3 is a flowchart illustrating pre-processing processes of chilled water leaving temperature control according to a first embodiment of the present invention.
Figure 4:
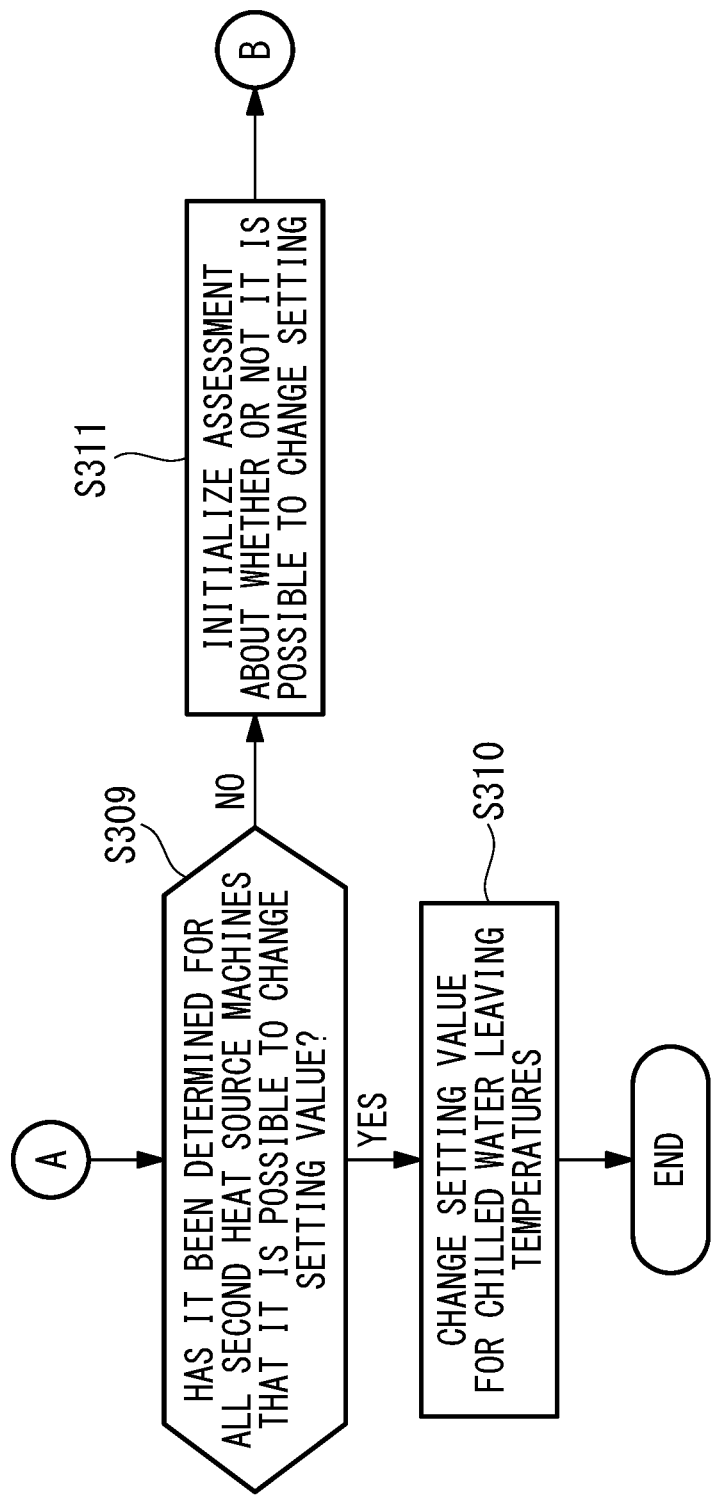
FIG. 4 is a flowchart illustrating post-processing processes of the chilled water leaving temperature control according to the first embodiment of the present invention.

FIG. 3 is a flowchart illustrating pre-processing processes of chilled water leaving temperature control according to the present embodiment. FIG. 4 is a flowchart illustrating post-processing processes of the chilled water leaving temperature control according to the present embodiment.

The superordinate controlling device 20 carries out chilled water leaving temperature control (heat transfer medium leaving temperature control) to control a chilled water leaving temperature (a heat transfer medium leaving temperature), which is the temperature of the chilled water supplied to the external load 6.

To carry out the chilled water leaving temperature control, the superordinate controlling device 20 permits changing a setting value for the chilled water leaving temperatures (the heat transfer medium leaving temperatures) of the heat-pump type chillers 2a and 2b, according to an underload stop condition of each of the absorption-type chillers 2c and 2d.

The chilled water leaving temperature control on the heat-pump type chillers 2a and 2b illustrated in the flowchart in FIG. 3 is carried out on each of the heat-pump type chillers 2a and 2b. In the present embodiment, the chilled water leaving temperature control carried out on the heat-pump type chillers 2a and 2b on the basis of the underload stop condition of the absorption-type chiller 2c will be explained.

First, the superordinate controlling device 20 judges whether or not the following process has been performed on all the absorption-type chillers 2c and 2d (S300). At step S300, when it is determined that the process has been performed on all the absorption-type chillers 2c and 2d, the process proceeds to step S309 in FIG. 4. The process at step S309 will be explained later. On the contrary, when it is determined at step S300 that the process has not been performed on all the absorption-type chillers 2c and 2d, the process proceeds to step S301.

At step S301, in consideration of changing the setting value for the chilled water leaving temperatures of the heat-pump type chillers 2a and 2b, it is judged which of the following is used as the underload stop condition of the absorption-type chiller 2c.

(A) When a prediction value (a post-change prediction value) of the chilled water leaving temperature minimum value of the absorption-type chiller 2c is expressed as T2out_a, T2out_a is equal to or smaller than a second underload stop threshold value.

(B) When a prediction value (a post-change prediction value) of the chilled water entering temperature minimum value of the absorption-type chiller 2c is expressed as T2in_a, T2in_a is equal to or smaller than a second underload stop threshold value.

(C) When a prediction value (a post-change prediction value) of a load factor of the absorption-type chiller 2c is expressed as L2_a, L2_a is equal to or smaller than a second underload stop threshold value.

In this situation, the load factor of the absorption-type chiller 2c is a ratio of an output of the absorption-type chiller 2c to a rated output of the absorption-type chiller 2c.

In the present embodiment, at step S301, the judging process is performed on only one of the three conditions. However, it is also acceptable to perform a judging process by using conditions (A), (B), and (C) above in combination. Alternatively, another arrangement is also acceptable in which the setting value for the chilled water leaving temperatures of the heat-pump type chillers 2a and 2b is changed when all of the three conditions are satisfied.

At step S301, when it is determined that (A) applies, the process proceeds to step S302. At step S301, when it is determined that (B) applies, the process proceeds to step S304. At step S301, when it is determined that (C) applies, the process proceeds to step S306.

At step S301, when it is determined that (A) applies, the prediction value T2out_a is predicted with respect to a transient minimum value of the chilled water leaving temperature of the absorption-type chiller 2c that would be changed due to the change of the setting value for the chilled water leaving temperatures of the heat-pump type chillers 2a and 2b (S302).

It is possible to express T2out_a by using Expression (1) presented below where T2out_b denotes the chilled water leaving temperature of the absorption-type chiller 2c observed before the chilled water leaving temperatures of the heat-pump type chillers 2a and 2b are changed; T1out_a denotes the setting temperature after the chilled water leaving temperatures of the heat-pump type chillers 2a and 2b are changed; T1out_b denotes the setting temperature before the chilled water leaving temperatures of the heat-pump type chillers 2a and 2b are changed; FR1_on denotes the chilled water flow rate of the heat-pump type chillers 2a and 2b during operation; and FRA_on denotes the chilled water flow rate of all the heat source machines 2 that are in operation.

$$T2out\_a = T2out\_b + \{(T1out\_a - T1out\_b) \times \Sigma(FR1\_on)\} / \Sigma(FRA\_on) \quad (1)$$

Subsequently, it is judged whether or not T2out_a derived from Expression (1) is larger than a second underload stop threshold value (a), which is a threshold value at which the absorption-type chiller 2c would reach an underload stop (S303). When it is determined that T2out_a is larger than the second underload stop threshold value (a), the process proceeds to step S308. On the contrary, when it is determined that T2out_a is equal to or smaller than the second underload stop threshold value (a), it is possible to assess that the absorption-type chiller 2c would reach an underload stop after the change of the setting value for the chilled water leaving temperatures of the heat-pump type chillers 2a and 2b. Accordingly, the process proceeds to step S302, without changing the setting value for the chilled water leaving temperatures of the heat-pump type chillers 2a and 2b, so as to predict a value of T2out_a again.

In this situation, the second underload stop threshold value (a) is the chilled water leaving temperature of the absorption-type chiller 2c at which the absorption-type chiller 2c would have an underload stop. Further, it is preferable to use a temperature obtained by adding a margin a to the threshold value (a). By adding the margin a, it is possible to prevent the occurrence of an underload stop with a higher certainty.

When it is determined at step S303 that T2out_a is larger than the second underload stop threshold value (a), it is possible to assess that the absorption-type chiller 2c will not have an underload stop after the change of the setting value for the chilled water leaving temperatures of the heat-pump type chillers 2a and 2b. It is therefore determined that it is possible to change the setting value for the chilled water leaving temperatures of the heat-pump type chillers 2a and 2b (S308), and the process returns to step S300.

At step S301, when it is determined that (B) applies, the prediction value T2in_a is predicted with respect to a transient minimum value of the chilled water entering temperature (the heat transfer medium entering temperature) of the absorption-type chiller 2c that would be changed due to the change of the setting value for the chilled water leaving temperatures of the heat-pump type chillers 2a and 2b (S304).

It is possible to express T2in_a by using Expression (2) presented below where T2in_b denotes the chilled water entering temperature of the absorption-type chiller 2c observed before the change of the chilled water leaving temperatures of the heat-pump type chillers 2a and 2b.

$$T2in\_a = T2in\_b + \{(T1out\_a - T1out\_b) \times \Sigma(FR1\_on)\} / \Sigma(FRA\_on) \quad (2)$$

Subsequently, it is judged whether or not T2in_a derived from Expression (2) is larger than a second underload stop threshold value (b), which is a threshold value at which the absorption-type chiller 2c would reach an underload stop (S305). When it is determined that T2in_a is larger than the second underload stop threshold value (b), the process proceeds to step S308. On the contrary, when it is determined that T2in_a is equal to or smaller than the second underload stop threshold value (b), it is possible to assess that the absorption-type chiller 2c would reach an underload stop after the change of the setting value for the chilled water leaving temperatures of the heat-pump type chillers 2a and 2b. Accordingly, the process proceeds to step S304, without changing the setting value for the chilled water leaving temperatures of the heat-pump type chillers 2a and 2b, so as to predict a value of T2in_a again.

In this situation, the second underload stop threshold value (b) is the chilled water entering temperature of the absorption-type chiller 2c at which the absorption-type chiller 2c would have an underload stop. Further, it is preferable to use a temperature obtained by adding the margin a to the threshold value (b). By adding the margin a, it is possible to prevent the occurrence of an underload stop with a higher certainty.

When it is determined at step S305 that T2in_a is larger than the second underload stop threshold value (b), it is possible to assess that the absorption-type chiller 2c will not have an underload stop after the change of the setting value for the chilled water leaving temperatures of the heat-pump type chillers 2a and 2b. It is therefore determined that it is possible to change the setting value for the chilled water leaving temperatures of the heat-pump type chillers 2a and 2b (S308), and the process returns to step S300.

At step S301, when it is determined that (C) applies, the prediction value L2_a is predicted with respect to a transient minimum value of the load factor of the absorption-type chiller 2c that would be changed due to the change of the setting value for the chilled water leaving temperatures of the heat-pump type chillers 2a and 2b (S306).

It is possible to express L2_a by using Expression (3) presented below where T2dif_a denotes a minimum value of the difference between the chilled water leaving temperature and the chilled water entering temperature of the absorption-type chiller 2c that will transiently occur in the absorption-type chiller 2c due to the change of the chilled water leaving temperatures of the heat-pump type chillers 2a and 2b; FR2 (m³/h) denotes the chilled water flow rate of the absorption-type chiller 2c; c (kcal/kg° C.) denotes the specific heat of the chilled water; d (kg/m³) denotes the specific gravity of the chilled water; and RC2 (kW) denotes the rated capacity of the absorption-type chiller 2c.

$$L2\_a = (T2\text{dif}\_a \times FR2 \times c \times d)/(860 \times RC2) \quad (3)$$

In this situation, it is possible to express T2dif_a by using Expression (4) presented below where T2dif_b denotes the difference between the chilled water leaving temperature and the chilled water entering temperature of the absorption-type chiller 2c observed before the change of the chilled water leaving temperatures of the heat-pump type chillers 2a and 2b.

$$T2\text{dif}\_a = T2\text{dif}\_b + \{(T1\text{out}\_a - T1\text{out}\_b) \times \Sigma(FR1\_on)\}/\Sigma(FRA\_on) \quad (4)$$

Subsequently, it is judged whether or not L2_a derived from Expression (3) is larger than a second underload stop threshold value (c), which is a threshold value at which the absorption-type chiller 2c would reach an underload stop (S307). When it is determined that L2_a is larger than the second underload stop threshold value (c), the process proceeds to step S308. On the contrary, when it is determined that L2_a is equal to or smaller than the second underload stop threshold value (c), it is possible to assess that the absorption-type chiller 2c would reach an underload stop after the change of the setting value for the chilled water leaving temperatures of the heat-pump type chillers 2a and 2b. Accordingly, the process proceeds to step S306, without changing the setting value for the chilled water leaving temperatures of the heat-pump type chillers 2a and 2b, so as to predict a value of L2_a again.

In this situation, the second underload stop threshold value (c) is the load factor of the absorption-type chiller 2c at which the absorption-type chiller 2c would have an underload stop. Further, it is preferable to use a load factor obtained by adding a margin a to the threshold value (c). By adding the margin a, it is possible to prevent the occurrence of an underload stop with a higher certainty.

When it is determined at step S307 that L2_a is larger than the second underload stop threshold value (c), it is possible to assess that the absorption-type chiller 2c will not reach an underload stop after the change of the setting value for the chilled water leaving temperatures of the heat-pump type chillers 2a and 2b. It is therefore determined that it is possible to change the setting value for the chilled water leaving temperatures of the heat-pump type chillers 2a and 2b (S308), and the process returns to step S300.

When the process returns to step S300 after the processes described above have been performed on each of all of the absorption-type chillers 2c and 2d, it is determined that the processes have been performed on all the absorption-type chillers 2c and 2d, so that the process proceeds to step S309 in FIG. 4. It is judged whether or not it is possible with respect to all the absorption-type chillers 2c and 2d to change the setting value for the chilled water leaving temperatures of the heat-pump type chillers 2a and 2b (S309). When it is determined that it is possible with respect to all the absorption-type chillers 2c and 2d to change the setting value, the process proceeds to step S310. At step S309, when it is determined that it is not possible with respect to at least one of the absorption-type chillers 2c and 2d to change the setting value, the setting value for the chilled water leaving temperatures of the heat-pump type chillers 2a and 2b will not be changed because the condition is not satisfied. Assessment information about whether or not it is possible to change the setting value for the chilled water leaving temperatures of the heat-pump type chillers 2a and 2b is initialized (S311), and the process returns to step S300. At step S309, when it is determined that it is possible with respect to all the absorption-type chillers 2c and 2d to change the setting value, because all the absorption-type chillers 2c and 2d satisfy the condition, the setting value for the chilled water leaving temperatures of the heat-pump type chillers 2a and 2b is changed to T1out_a (S310).

As explained above, by using the heat source system controlling device, the heat source system, the heat source system controlling method, and the heat source system controlling program according to the present embodiment, it is possible to achieve advantageous effects as follows:

When the chilled water leaving temperature of each of the absorption-type chillers 2c and 2d predicted based on the supposition that the chilled water leaving temperatures of the heat-pump type chillers 2a and 2b are changed would be larger than the underload stop threshold value of the absorption-type chillers 2c and 2d, the chilled water leaving temperatures of the heat-pump type chillers 2a and 2b will be changed. In this manner, the change in the chilled water leaving temperature of each of the absorption-type chillers 2c and 2d to be caused by the change in the chilled water leaving temperatures of the heat-pump type chillers 2a and 2b is predicted, so as to exercise control in such a manner that the absorption-type chillers 2c and 2d will not have an underload stop. It is therefore possible to change the chilled water leaving temperatures of the heat-pump type chillers 2a and 2b, without the possibility of causing the absorption-type chillers 2c and 2d to have an underload stop.

Further, because the chilled water leaving temperatures of the heat-pump type chillers 2a and 2b are controlled, it is possible to carry out load-distributed control based on efficiency levels (the COPs) of the heat source machines 2.

Furthermore, when it is determined that at least one of the absorption-type chillers 2c and 2d would have an underload stop, the chilled water leaving temperatures of the heat-pump type chillers 2a and 2b will not be changed. It is therefore possible to avoid the situation where the absorption-type chillers 2c and 2d have an underload stop.

In contrast, when the chilled water entering temperature of each of the absorption-type chillers 2c and 2d predicted based on the supposition that the chilled water leaving temperatures of the heat-pump type chillers 2a and 2b are changed would be larger than the underload stop threshold value of the absorption-type chillers 2c and 2d, the chilled water leaving temperatures of the heat-pump type chillers 2a and 2b will be changed. In this manner, the change in the chilled water entering temperature of each of the absorption-type chillers 2c and 2d to be caused by the change in the chilled water leaving temperatures of the heat-pump type chillers 2a and 2b is predicted, so as to exercise control in such a manner that the absorption-type chillers 2c and 2d will not have an underload stop. It is therefore possible to change the chilled water leaving temperatures of the heat-pump type chillers 2a and 2b, without the possibility of causing the absorption-type chillers 2c and 2d to have an underload stop.

Further, when the load factor of each of the absorption-type chillers 2c and 2d predicted based on the supposition that the chilled water leaving temperatures of the heat-pump type chillers 2a and 2b are changed would be larger than the underload stop threshold value of the absorption-type chillers 2c and 2d, the chilled water leaving temperatures of the heat-pump type chillers 2a and 2b will be changed. In this manner, the change in the load factor of each of the absorption-type chillers 2c and 2d to be caused by the change in the chilled water leaving temperatures of the heat-pump type chillers 2a and 2b is predicted, so as to exercise control in such a manner that the absorption-type chillers 2c and 2d will not have an underload stop. It is therefore possible to change the chilled water leaving temperatures of the heat-pump type chillers 2a and 2b, without the possibility of causing the absorption-type chillers 2c and 2d to have an underload stop.

Second Embodiment

A second embodiment of the present invention will be explained below, with reference to FIG. 5.

In the first embodiment described above, the setting value for the chilled water leaving temperatures of the heat-pump type chillers is changed in accordance with the underload stop condition of the absorption-type chillers. In contrast, the present embodiment is designed to avoid underload stops of the heat-pump type chillers and the absorption-type chillers that may be caused when the post-change setting value for the chilled water leaving temperatures of the heat-pump type chillers is returned to the pre-change value. The other configurations are the same as those in the first embodiment. Accordingly, the same configurations will be referred to by using the same reference characters, and the explanations thereof will be omitted.

Figure 5:
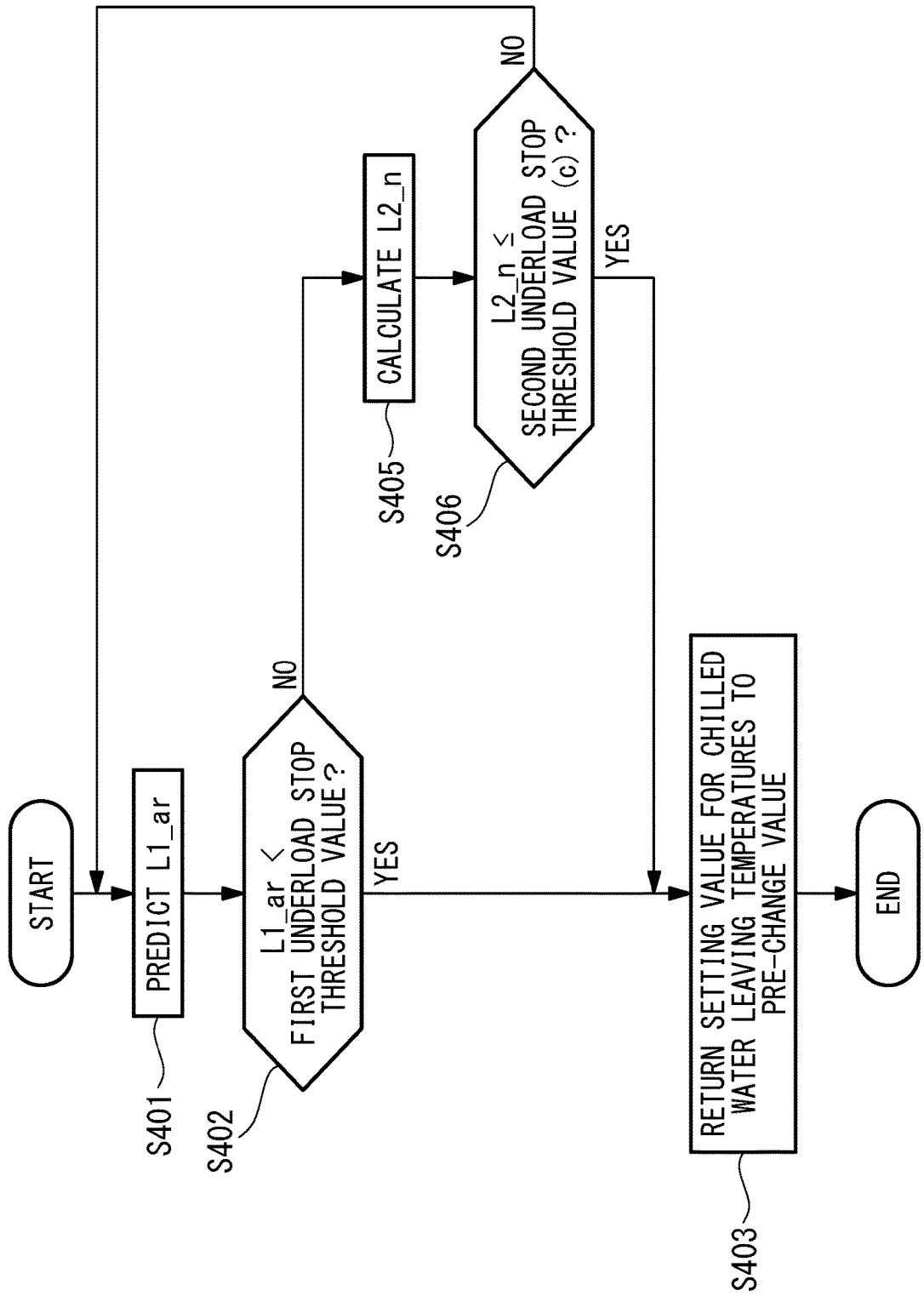
FIG. 5 is a flowchart illustrating chilled water leaving temperature control according to a second embodiment of the present invention.

FIG. 5 is a flowchart illustrating chilled water leaving temperature control carried out in a heat source system according to the present embodiment.

The chilled water leaving temperature control shown in the flowchart in FIG. 5 is carried out on each of the heat-pump type chillers 2a and 2b. In the present embodiment, the chilled water leaving temperature control carried out on the heat-pump type chiller 2a will be explained.

In consideration of returning the setting value for the chilled water leaving temperatures of the heat-pump type chillers 2a and 2b that was changed at step S310 in FIG. 4 to the pre-change value, a prediction value L1_ar is predicted with respect to a transient minimum value of the load factor of the heat-pump type chiller 2a (S401).

It is possible to express L1_ar by using Expression (5) presented below, when T1in_n denotes the current chilled water entering temperature of the heat-pump type chiller 2a; T1out_b denotes the chilled water leaving temperature of the heat-pump type chiller 2a observed before the change of the chilled water leaving temperatures of the heat-pump type chillers 2a and 2b (i.e., returned to the original temperature); FR1 denotes the chilled water flow rate of the heat-pump type chiller 2a; and RC1 denotes the rated capacity of the heat-pump type chiller 2a.

$$L1\_ar=\{(T1in\_n-T1out\_b)\times FR1\times c\times d\}/(860\times RC1) \quad (5)$$

Subsequently, it is judged whether or not the prediction value L1_ar derived from Expression (5) is smaller than a first underload stop threshold value at which the heat-pump type chiller 2a would reach an underload stop (S402). When it is determined that L1_ar is smaller than the first underload stop threshold value, the process proceeds to step S403. On the contrary, when it is determined that L1_ar is equal to or larger than the first underload stop threshold value, it is possible to assess that the heat-pump type chiller 2a will not reach an underload stop after the setting value for the chilled water leaving temperatures of the heat-pump type chillers 2a and 2b is returned to the original temperature. Accordingly, the process proceeds to step S405 without returning the setting value for the chilled water leaving temperatures of the heat-pump type chillers 2a and 2b to the original temperature.

In this situation, the first underload stop threshold value is the load factor of the heat-pump type chiller 2a at which the heat-pump type chiller 2a would have an underload stop. Further, it is preferable to use a load factor obtained by adding the margin a to the first underload stop threshold value. By adding the margin a, it is possible to prevent the occurrence of an underload stop with a higher certainty.

At step S402, when it is determined that the prediction value L1_ar is smaller than the first underload stop threshold value, it is possible to assess that the heat-pump type chiller 2a would have an underload stop after the setting value for the chilled water leaving temperatures of the heat-pump type chillers 2a and 2b is returned to the pre-change value. Accordingly, the setting value for the chilled water leaving temperatures of the heat-pump type chillers 2a and 2b is returned to the pre-change setting value T1out_b before the heat-pump type chiller 2a reaches an underload stop (step S403).

Subsequently, the chilled water leaving temperature control described above is similarly carried out also on the remaining heat-pump type chillers (i.e., the heat-pump type chiller 2b in the present embodiment).

Further, in consideration of returning the chilled water leaving temperature to the pre-change value, an underload stop is avoided also for the absorption-type chillers 2c and 2d.

The following sections will explain processes to be performed to avoid an underload stop of the absorption-type chiller 2c, for example.

At step S402, when it is determined that L1_ar is equal to or larger than the first underload stop threshold value, the process proceeds to step S405.

In consideration of returning the changed setting value for the chilled water leaving temperatures of the heat-pump type chillers 2a and 2b to the pre-change value, the current load factor L2_n of the absorption-type chiller 2c is calculated (S405).

It is possible to express L2_n by using Expression (6) presented below where T2dif_n denotes the difference between the chilled water leaving temperature and the chilled water entering temperature of the absorption-type chiller 2c; FR2 (m$^3$/h) denotes the chilled water flow rate of the absorption-type chiller 2c; c (kcal/kg° C.) denotes the specific heat of the chilled water; d (kg/m$^3$) denotes the specific gravity of the chilled water; and RC2 (kW) denotes the rated capacity of the absorption-type chiller 2c.

$$L2\_n=(T2dif\_n\times FR2\times c\times d)/(860\times RC2) \quad (6)$$

Subsequently, it is judged whether or not L2_n derived from Expression (6) is smaller than the second underload stop threshold value (c) at which the absorption-type chiller 2c would reach an underload stop (S406). When it is determined that L2_n is smaller than the second underload stop threshold value (c), the process proceeds to step S403. On the contrary, when it is determined that L2_n is equal to or larger than the second underload stop threshold value (c), it is possible to assess that the absorption-type chiller 2c will not reach an underload stop. Accordingly, the process proceeds to step S401, without returning the setting value for the chilled water leaving temperatures of the heat-pump type chillers 2a and 2b to the pre-change value.

At step S406, when it is determined that L2_n is smaller than the second underload stop threshold value (c), it is possible to assess that the absorption-type chiller 2c would have an underload stop. Accordingly, the setting value for the chilled water leaving temperatures of the heat-pump type chillers 2a and 2b is returned to the pre-change setting value T1out_b before an underload stop occurs (S403), so as to prevent the occurrence of an underload stop.

When the heat source system 1 includes two or more absorption-type chillers such as the absorption-type chillers 2c and 2d, the judging process at step S405 may be performed on each of the absorption-type chillers 2c and 2d.

As explained above, by using the heat source system controlling device, the heat source system, the heat source system controlling method, and the heat source system controlling program according to the present embodiment, it is possible to achieve advantageous effects as follows:

When the load factor of each of the heat-pump type chillers 2a and 2b predicted based on the supposition that the chilled water leaving temperatures of the heat-pump type chillers 2a and 2b are returned to the pre-change value would be smaller than the underload stop threshold value of the heat-pump type chillers 2a and 2b, the chilled water leaving temperatures of the heat-pump type chillers 2a and 2b will be returned to the original temperature. In this manner, the change in the load factor of each of the heat-pump type chillers 2a and 2b to be caused by the change in the chilled water leaving temperatures of the heat-pump type chillers 2a and 2b is predicted, so as to exercise control in such a manner that the heat-pump type chillers 2a and 2b will not have an underload stop. It is therefore possible to change the chilled water leaving temperatures of the heat-pump type chillers 2a and 2b, without the possibility of causing the heat-pump type chillers 2a and 2b to have an underload stop.

Further, when it is determined that at least one of the heat-pump type chillers 2a and 2b would have an underload stop, the chilled water leaving temperatures of the heat-pump type chillers 2a and 2b will be returned to the pre-change value. It is therefore possible to avoid the situation where the heat-pump type chillers 2a and 2b have an underload stop.

Further, when the load factor of each of the absorption-type chillers 2c and 2d is smaller than the underload stop threshold value of the absorption-type chillers 2c and 2d, the chilled water leaving temperatures of the heat-pump type chillers 2a and 2b will be returned to the original value. In this manner, the current load factor of each of the absorption-type chillers 2c and 2d to be caused by the change in the chilled water leaving temperatures of the heat-pump type chillers 2a and 2b is calculated, so as to exercise control in such a manner that the absorption-type chillers 2c and 2d will not have an underload stop. Accordingly, it is possible to change the chilled water leaving temperatures of the heat-pump type chillers 2a and 2b, without the possibility of causing the absorption-type chillers 2c and 2d to have an underload stop.

Furthermore, when it is determined that at least one of the absorption-type chillers 2c and 2d would have an underload stop, the chilled water leaving temperatures of the heat-pump type chillers 2a and 2b will be returned to the pre-change value. It is therefore possible to avoid the situation where the absorption-type chillers 2c and 2d have an underload stop.

Third Embodiment

Next, a third embodiment of the present invention will be explained, with reference to FIG. 6.

The first embodiment described above is designed to avoid underload stops of the absorption-type chillers that may be caused by the change of the setting value for the chilled water leaving temperatures of the heat-pump type chillers. In contrast, the present embodiment is designed to avoid overload operations of the heat-pump type chillers that may be caused by a change of the setting value for the chilled water leaving temperatures of the heat-pump type chillers. The other configurations are the same as those in the first embodiment. Accordingly, the same configurations will be referred to by using the same reference characters, and the explanations thereof will be omitted.

Figure 6:
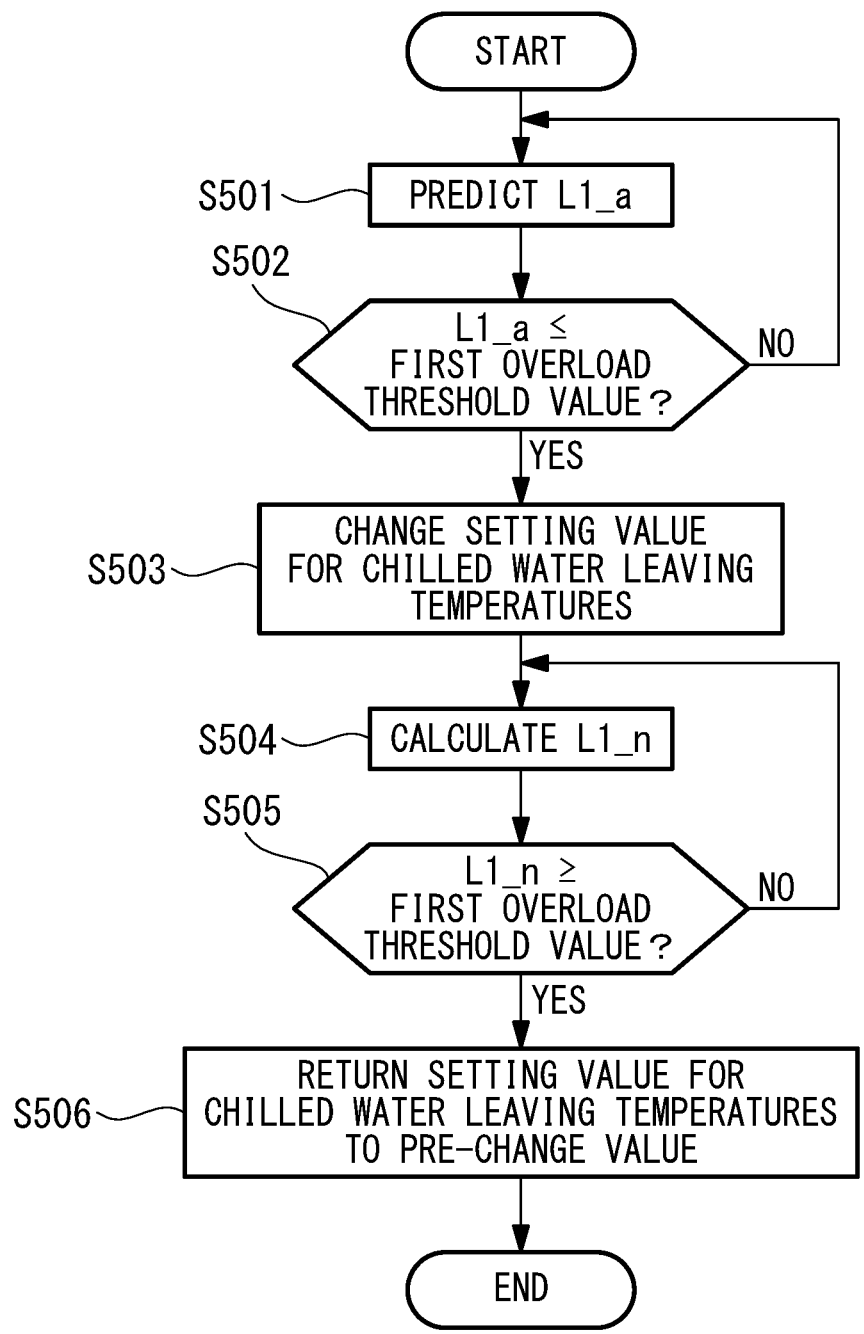
FIG. 6 is a flowchart illustrating chilled water leaving temperature control according to a third embodiment of the present invention.

FIG. 6 is a flowchart illustrating chilled water leaving temperature control carried out in a heat source system according to the present embodiment.

The chilled water leaving temperature control illustrated in the flowchart in FIG. 6 is carried out on each of the heat-pump type chillers 2a and 2b. In the present embodiment, the chilled water leaving temperature control carried out on the heat-pump type chiller 2a will be explained.

In consideration of changing the setting value for the chilled water leaving temperatures, at first, a prediction value $L1\_a$ is predicted with respect to a transient maximum value of the load factor of the heat-pump type chiller 2a that would be changed due to the change in the setting value for the chilled water leaving temperatures (S501).

It is possible to express $L1\_a$ by using Expression (7) presented below where T1dif_a denotes the maximum value of the difference between the chilled water leaving temperature and the chilled water entering temperature of the heat-pump type chiller 2a that is transiently caused by a change in the chilled water leaving temperatures of the heat-pump type chillers 2a and 2b; FR1 ($m^3/h$) denotes a chilled water flow rate of the heat-pump type chiller 2a; c (kcal/kg° C.) denotes the specific heat of the chilled water; d ($kg/m^3$) denotes the specific gravity of the chilled water; and RC1 (kW) denotes the rated capacity of the heat-pump type chiller 2a.

$$L1\_a = (T1\text{dif}\_a \times FR1 \times c \times d)/(860 \times RC1) \quad (7)$$

In this situation, it is possible to express T1dif_a by using Expression (8) presented below where T1dif_b denotes the difference between the chilled water leaving temperature and the chilled water entering temperature of the heat-pump type chiller 2a observed before the change of the chilled water leaving temperatures of the heat-pump type chillers 2a and 2b; and FR2 on denotes the chilled water flow rate of the absorption-type chillers 2c and 2d in operation.

$$T1\text{dif}\_a = T1\text{dif}\_b - \{(T1\text{out}\_a - T1\text{out}\_b) \times (FR2\_\text{on})\}/\Sigma(FRA\_\text{on}) \quad (8)$$

Subsequently, it is judged whether or not $L1\_a$ derived from Expression (7) is equal to or smaller than a first overload threshold value at which the heat-pump type chiller 2a would reach an overload operation (S502). When it is determined that L1_a is equal to or smaller than the first overload threshold value, the process proceeds to step S503. On the contrary, when it is determined that L1_a is larger than the first overload threshold value, it is possible to assess that the heat-pump type chiller 2a would reach an overload operation after the change of the setting value for the chilled water leaving temperatures of the heat-pump type chillers 2a and 2b. Accordingly, the process proceeds to step S501, without changing the setting value for the chilled water leaving temperatures of the heat-pump type chillers 2a and 2b so as to predict L1_a again.

In this situation, the overload operation denotes a state in which a load exceeding the rated capacity is imposed. The first overload threshold value is the load factor of the heat-pump type chiller 2a at which the heat-pump type chiller 2a would reach an overload operation and is equal to a rated load, i.e., 100%. Further, it is preferable to use a load factor obtained by subtracting a parameter a serving as a margin from the first overload threshold value. By subtracting the parameter a, it is possible to prevent the occurrence of an overload operation with a higher certainty.

At step S502, when it is determined that L1_a is equal to or smaller than the first overload threshold value, it is possible to assess that the heat-pump type chiller 2a will not reach an overload operation after the change of the setting value for the chilled water leaving temperatures of the heat-pump type chillers 2a and 2b. Accordingly, the setting value for the chilled water leaving temperatures of the heat-pump type chillers 2a and 2b is changed to T1out_a (S503).

Subsequently, the chilled water leaving temperature control described above is similarly carried out also on the remaining heat-pump type chillers (the heat-pump type chiller 2b in the present embodiment).

Further, while the heat source system 1 includes two or more heat-pump type chillers such as the heat-pump type chillers 2a and 2b, when it is determined at step S502 that L1_a is equal to or smaller than the first overload threshold value, another arrangement is also acceptable in which the setting value for the chilled water leaving temperatures is changed only for a part of the heat-pump type chillers (e.g., the heat-pump type chiller 2a).

Next, avoiding overload operations of the heat-pump type chiller 2a after changing the setting value for the chilled water leaving temperatures will be explained.

First, in consideration of returning the setting value for the chilled water leaving temperatures of the heat-pump type chillers 2a and 2b that was changed at step S503 in FIG. 6 to the pre-change value, the current load factor L1_n of the heat-pump type chiller 2a is calculated (S504).

It is possible to express L1_n by using Expression (9) presented below where T1dif_n denotes the current difference between the chilled water leaving temperature and the chilled water entering temperature of the heat-pump type chiller 2a; FR1 (m³/h) denotes the chilled water flow rate of the heat-pump type chiller 2a; c (kcal/kg° C.) denotes the specific heat of the chilled water; d (kg/m³) denotes the specific gravity of the chilled water; and RC1 (kW) denotes the rated capacity of the heat-pump type chiller 2a.

$$L1\_n = (T1dif\_n \times FR1 \times c \times d)/(860 \times RC1) \quad (9)$$

Subsequently, it is judged whether or not L1_n derived from Expression (9) is equal to or larger than the first overload threshold value that is a threshold value at which the heat-pump type chiller 2a would reach an overload operation (S505). When it is determined that L1_n is equal to or larger than the first overload threshold value, the process proceeds to step S506. On the contrary, when it is determined that L1_n is smaller than the first overload threshold value, it is possible to assess that the heat-pump type chiller 2a will not later reach an overload operation even without returning the setting value for the chilled water leaving temperatures of the heat-pump type chillers 2a and 2b to the pre-change value. Accordingly, the process proceeds to step S504 without changing the setting value for the chilled water leaving temperatures of the heat-pump type chillers 2a and 2b, so as to calculate L1_a again.

At step S505, when it is determined that L1_n is equal to or higher than the first overload threshold value, it is possible to assess that the heat-pump type chiller 2a would reach an overload operation. Accordingly, the setting value for the chilled water leaving temperatures is returned to the pre-change setting value T1out_b (S506), so as to prevent the occurrence of an overload operation.

Subsequently, the chilled water leaving temperature control described above is similarly carried out also on the remaining heat-pump type chillers (i.e., the heat-pump type chiller 2b in the present embodiment).

Further, while the heat source system 1 includes two or more heat-pump type chillers such as the heat-pump type chillers 2a and 2b, when it is determined at step S505 that L1_n is equal to or larger than the first overload threshold value, another arrangement is also acceptable in which the setting value for the chilled water leaving temperatures is changed (returned to the pre-change value) only for a part of the heat-pump type chillers, e.g., the heat-pump type chiller 2a.

As explained above, by using the heat source system controlling device, the heat source system, the heat source system controlling method, and the heat source system controlling program according to the present embodiment, it is possible to achieve advantageous effects as follows:

Based on the supposition that the chilled water leaving temperatures of the heat-pump type chillers 2a and 2b are changed, when the load factor of each of the heat-pump type chillers 2a and 2b would be equal to or smaller than the first overload threshold value of the heat-pump type chillers 2a and 2b, the chilled water leaving temperatures of the heat-pump type chillers 2a and 2b will be changed. The change in the load factor of each of the heat-pump type chillers 2a and 2b to be caused by the change of the chilled water leaving temperatures of the heat-pump type chillers 2a and 2b is predicted, so as to exercise control in such a manner that the heat-pump type chillers 2a and 2b will not have an overload operation. Accordingly, it is possible to change the chilled water leaving temperatures without the possibility of causing the heat-pump type chillers 2a and 2b to have an overload operation.

Further, because the chilled water leaving temperatures of the heat-pump type chillers 2a and 2b are controlled, it is possible to carry out load-distributed control based on efficiency levels (the COPs) of the heat source machines 2.

In addition, when it is determined that at least one of the heat-pump type chillers 2a and 2b would have an overload operation, the chilled water leaving temperatures will not be changed. Accordingly, it is possible to avoid the situation where the heat-pump type chillers 2a and 2b have an overload operation.

Further, when the current load factor of each of the heat-pump type chillers 2a and 2b observed after the change of the chilled water leaving temperatures is equal to or larger than the first overload threshold value of the heat-pump type chillers 2a and 2b, the chilled water leaving temperatures of the heat-pump type chillers 2a and 2b will be returned to the pre-change values. With this arrangement, it is possible to change the chilled water leaving temperatures of the heat-pump type chillers 2a and 2b without the possibility of causing the heat-pump type chillers 2a and 2b to have an overload operation.

Fourth Embodiment

Next, a fourth embodiment of the present invention will be explained.

In the first to the third embodiments described above, the conditions are judged on the basis of the chilled water leaving temperatures, the chilled water entering temperatures, the load factors of the heat source machines, and the like. In contrast, the present embodiment is designed to eliminate transient fluctuations in the values used for the condition judging processes. The other configurations are the same as those in the first to the third embodiments. Accordingly, the same configurations will be referred to by using the same reference characters, and the explanations thereof will be omitted.

For example, in the first embodiment, the judgment on the condition varies depending on which one of the following is used as the underload stop condition of the absorption-type chiller 2c:

(A) T2out_a is equal to or smaller than the second underload stop threshold value;
(B) T2in_a is equal to or smaller than the second underload stop threshold value; and
(C) L2_a is equal to or smaller than the second underload stop threshold value.

In other words, the condition judging process for the underload stop is performed on the basis of T2out_a, which is a prediction value for the minimum value of the chilled water leaving temperature of the absorption-type chiller 2c; T2in_a, which is a prediction value for the minimum value of the chilled water entering temperature of the absorption-type chiller 2c; and L2_a, which is a prediction value for the load factor of the absorption-type chiller 2c.

However, the abovementioned values used for the condition judging process may transiently fluctuate in accordance with fluctuations in the loads or in the chilled water temperature measured value, the loads being affected by running and stopping of the heat source machines 2, the pumps 3, and the external load 6 of the heat source system 1.

For example, during a certain time period after each of the absorption-type chillers 2c and 2d is started up, the abovementioned values used for the condition judging process keep changing because, generally speaking, it takes time for the absorption-type chillers 2c and 2d to exert the capabilities thereof. When the condition judging process for underload stops is performed on the basis of the values that keep changing, an unexpected judgment result may be derived. In that situation, there is a possibility that not only the system COP may be degraded, but an underload stop may occur.

To cope with this situation, for example, when the underload stop condition of the absorption-type chiller 2c is "(A) T2out_a is equal to or smaller than the second underload stop threshold value (a)", the present embodiment is configured to change the setting value for the chilled water leaving temperatures of the heat-pump type chillers 2a and 2b, when the abovementioned value used for the condition judging process becomes a stable value, i.e., when the condition (step S303: Yes in FIG. 3) where T2out_a is larger than the second underload stop threshold value (a) has been satisfied for a prescribed period of time.

In this manner, when each of the values used for the condition judging process of the underload stop condition and the overload condition has satisfied the condition for the prescribed period of time, the setting value for the chilled water leaving temperatures of the heat-pump type chillers 2a and 2b is either changed or returned.

As explained above, by using the heat source system controlling device, the heat source system, the heat source system controlling method, and the heat source system controlling program according to the present embodiment, it is possible to achieve advantageous effects as follows:

The values (the chilled water leaving temperature of each of the absorption-type chillers 2c and 2d, the chilled water entering temperature of each of the absorption-type chillers 2c and 2d, and the load factor of each of the absorption-type chillers 2c and 2d) used for judging the condition for an underload stop of each of the absorption-type chillers 2c and 2d are values that transiently fluctuate in accordance with changes in the heat source machines 2, the pumps 3, and the external load 6 of the heat source system 1. For example, the abovementioned values used for the condition judging process keep changing for a certain period of time after the absorption-type chiller 2c is started up, because it takes time for the absorption-type chiller 2c to exert the capability thereof. When the judging process is performed by using each of the abovementioned values used for the condition judging process based on the values that keep changing and the second underload stop threshold value, there is a possibility that it may not be possible to make an accurate judgment, because the abovementioned values used for the condition judging process contain the transient fluctuations. When the judging process contains the transient fluctuations, unnecessary control would be carried out, and there is a possibility that not only the COP of the entire heat source system 1 might be degraded, but also an underload stop might occur.

To cope with this situation, the chilled water leaving temperature control is carried out, when the time period during which the selected one of the abovementioned values used for the condition judging process of each of the absorption-type chillers 2c and 2d is larger than the second underload stop threshold value is equal to or longer than a predetermined length of time. With this arrangement, it is possible to avoid the situation where the judgment contains the transient fluctuations of the abovementioned values used for the condition judging process. Further, it is possible to improve the COP of the entire heat source system 1 and to avoid underload stops.

Further, the load factor that is used for the condition judging process for underload stops and overload operations of each of the heat-pump type chillers 2a and 2b is a value that transiently changes in accordance with changes in the heat source machines 2, the pumps 3, and the external load 6 in the heat source system 1. When the judging process is performed by using the load factor of each of the heat-pump type chillers 2a and 2b that transiently changes and the first underload stop threshold value, there is a possibility that it may not be possible to make an accurate judgment, because the load factor of each of the heat-pump type chillers 2a and 2b contains the transient fluctuations. When the judging process contains the transient fluctuations, unnecessary control would be carried out, and there is a possibility that not only the COP of the entire heat source system 1 might be degraded, but also an underload stop might occur.

To cope with this situation, the chilled water leaving temperature control is carried out when the time period during which the load factor of each of the heat-pump type chillers 2a and 2b is larger than the first underload stop threshold value is equal to or longer than a predetermined length of time. Further, the chilled water leaving temperature control is carried out, when the time period during which the load factor of each of the heat-pump type chillers 2a and 2b is smaller than the first overload threshold value is equal to or longer than a predetermined length of time. With these arrangements, it is possible to avoid the situation where the judgment contains the transient fluctuations of the load factor of each of the heat-pump type chillers 2a and 2b. Further, it is possible to improve the COP of the entire heat source system 1 and to avoid underload stops.

The same applies to avoiding overload operations.

The embodiments of the present invention have so far been explained in detail, with reference to the drawings. However, specific configurations are not limited to the configurations described in the embodiments and may include design modifications, as long as results of the modifications do not depart from the scope of the present invention.

For example, it is acceptable to carry out any of the embodiments described above in combination.

Further, in the embodiments described above, it is possible to arbitrarily determine the quantity of the heat-pump type chillers 2a and 2b and the absorption-type chillers 2c and 2d being installed and the combination thereof.

Further, in the embodiments described above, the first heat source machine is a heat-pump type chiller, whereas the second heat source machine is an absorption-type chiller. However, as long as the first heat source machine is a heat source machine having a higher COP among the heat source machines while the second heat source machine is a heat source machine having a lower COP than that of the first heat source machine, the types of the heat source machines do not matter. For instance, examples of possible combinations of the first heat source machine and the second heat source machine include: an electric heat source machine and a fuel-based heat source machine; a large turbo chiller and a small turbo chiller; a variable speed turbo heat source machine and a fixed speed turbo heat source machine.

In the embodiments described above, the heat-pump type chillers 2a and 2b and the absorption-type chillers 2c and 2d are configured to cool the chilled water, i.e., to output cold heat. However, the chillers may be configured to heat the chilled water, i.e., to output hot heat. Further, the chillers may each be provided with both a cooling function and a heating function. Furthermore, the system may be configured to cool or heat another type of heat transfer medium such as brine, in place of the chilled water.

When hot heat is output, temperatures are handled in the opposite manner compared to the situation where cold heat is output. For example, as for the underload stop condition of the absorption-type chiller 2c, the underload stop condition defines the chilled water leaving temperature of the absorption-type chiller 2c being equal to or higher than a predetermined level.

EXPLANATION OF REFERENCE

1: heat source system
2: heat source machine
2a, 2b: heat-pump type chiller
2c, 2d: absorption-type chiller
3: pump
4: supply header
5: return header
6: external load
10a, 10b, 10c, 10d: chiller controlling device
20: superordinate controlling device

The invention claimed is:

1. A heat source system controlling device that is applied to a heat source system including a plurality of heat sources and that controls a first heat source machine and a second heat source machine in such a manner that a heat transfer medium leaving temperature, which is a temperature of a heat transfer medium supplied to an external load, is equal to a setting temperature, wherein
   the first heat source machine has a higher Coefficient of Performance (COP) than that of the second heat source machine, and
   the heat source system controlling device comprises a heat transfer medium leaving temperature changer carrying out heat transfer medium leaving temperature control, by changing a heat transfer medium leaving temperature of the first heat source machine, when a post-change prediction value of the second heat source machine exceeds a second underload stop threshold value at which the second heat source machine would have an underload stop,
   the post-change prediction value being predicted based on a supposition that the heat transfer medium leaving temperature of the first heat source machine is changed to a post-change setting temperature of the heat transfer medium leaving temperature, and the post-change prediction value being derived by use of a pre-change setting temperature and the post-change setting temperature of the heat transfer medium leaving temperature of the first heat source machine.

2. The heat source system controlling device according to claim 1, wherein
   the post-change prediction value is a heat transfer medium leaving temperature of the second heat source machine, and
   the second underload stop threshold value is a value based on the heat transfer medium leaving temperature of the second heat source machine.

3. The heat source system controlling device according to claim 1, wherein
   the post-change prediction value is a heat transfer medium entering temperature of the second heat source machine, and
   the second underload stop threshold value is a value based on the heat transfer medium entering temperature of the second heat source machine.

4. The heat source system controlling device according to claim 1, wherein
   the post-change prediction value is a load factor of the second heat source machine, and
   the second underload stop threshold value is a value based on the load factor of the second heat source machine.

5. The heat source system controlling device according to claim 1, wherein
   the heat transfer medium leaving temperature control is carried out when a time period during which the post-change prediction value of the second heat source machine exceeds the second underload stop threshold value is equal to or longer than a predetermined length of time.

6. The heat source system controlling device according to claim 1, comprising:
   the heat transfer medium leaving temperature changer carrying out the heat transfer medium leaving temperature control by returning the heat transfer medium leaving temperature of the first heat source machine to a pre-change value, when a load factor of the first heat source machine predicted based on a supposition that the heat transfer medium leaving temperature of the first heat source machine is returned to the pre-change value is smaller than a first underload stop threshold value at which the first heat source machine would have an underload stop.

7. The heat source system controlling device according to claim 6, wherein
the heat transfer medium leaving temperature control is carried out when a time period during which the load factor of the first heat source machine predicted based on the supposition that the heat transfer medium leaving temperature of the first heat source machine is returned to the pre-change value is smaller than the first underload stop threshold value is equal to or longer than a predetermined length of time.

8. The heat source system controlling device according to claim 1, comprising:
the heat transfer medium leaving temperature changer carrying out the heat transfer medium leaving temperature control by changing the heat transfer medium leaving temperature of the first heat source machine, when a load factor of the first heat source machine predicted based on a supposition that the heat transfer medium leaving temperature of the first heat source machine is changed is smaller than a first overload threshold value at which the first heat source machine would have an overload operation.

9. The heat source system controlling device according to claim 8, wherein
the heat transfer medium leaving temperature control is carried out when a time period during which the load factor of the first heat source machine predicted based on the supposition that the heat transfer medium leaving temperature of the first heat source machine is changed is smaller than the first overload threshold value is equal to or longer than a predetermined length of time.

10. The heat source system controlling device according to claim 8, comprising:
the heat transfer medium leaving temperature changer carrying out the heat transfer medium leaving temperature control by returning the heat transfer medium leaving temperature of the first heat source machine to the pre-change value, when the load factor of the first heat source machine observed in a state where the heat transfer medium leaving temperature of the first heat source machine has been changed exceeds the first overload threshold value at which the first heat source machine would have an overload operation.

11. The heat source system controlling device according to claim 10, wherein
the heat transfer medium leaving temperature control is carried out when a time period during which the load factor of the first heat source machine observed in the state where the heat transfer medium leaving temperature of the first heat source machine has been changed exceeds the first overload threshold value is equal to or longer than a predetermined length of time.

12. A heat source system comprising the heat source system controlling device according to claim 1.

13. A heat source system controlling method that is applied to a heat source system including a plurality of heat sources and is used for controlling a first heat source machine and a second heat source machine in such a manner that a heat transfer medium leaving temperature, which is a temperature of a heat transfer medium supplied to an external load, is equal to a setting temperature, wherein
the first heat source machine has a higher Coefficient of Performance (COP) than that of the second heat source machine, and
the heat source system controlling method comprises a heat transfer medium leaving temperature changing step of changing a heat transfer medium leaving temperature of the first heat source machine, when a post-change prediction value of the second heat source machine exceeds a second underload stop threshold value at which the second heat source machine would have an underload stop,
the post-change prediction value being predicted based on a supposition that the heat transfer medium leaving temperature of the first heat source machine is changed to a post-change setting temperature of the heat transfer medium leaving temperature, and the post-change prediction value being derived by use of a pre-change setting temperature and the post-change setting temperature of the heat transfer medium leaving temperature of the first heat source machine.

14. A heat source system controlling program that is applied to a heat source system including a plurality of heat sources and is used for controlling a first heat source machine and a second heat source machine in such a manner that a heat transfer medium leaving temperature, which is a temperature of a heat transfer medium supplied to an external load, is equal to a setting temperature, wherein
the first heat source machine has a higher Coefficient of Performance (COP) than that of the second heat source machine, and
the heat source system controlling program comprises a heat transfer medium leaving temperature changing step of changing a heat transfer medium leaving temperature of the first heat source machine, when a post-change prediction value of the second heat source machine a second underload stop threshold value at which the second heat source machine would have an underload stop,
the post-change prediction value being predicted based on a supposition that the heat transfer medium leaving temperature of the first heat source machine is changed to a post-change setting temperature of the heat transfer medium leaving temperature, and the post-change prediction value being derived by use of a pre-change setting temperature and the post-change setting temperature of the heat transfer medium leaving temperature of the first heat source machine.

15. The heat source system controlling device according to claim 2, wherein
the heat transfer medium leaving temperature control is carried out when a time period during which the post-change prediction value of the second heat source machine exceeds the second underload stop threshold value is equal to or longer than a predetermined length of time.

16. The heat source system controlling device according to claim 3, wherein
the heat transfer medium leaving temperature control is carried out when a time period during which the post-change prediction value of the second heat source machine exceeds the second underload stop threshold value is equal to or longer than a predetermined length of time.

17. The heat source system controlling device according to claim 4, wherein the heat transfer medium leaving temperature control is carried out when a time period during which the post-change prediction value of the second heat source machine exceeds the second underload stop threshold value is equal to or longer than a predetermined length of time.

18. The heat source system controlling device according to claim 2, comprising:
the heat transfer medium leaving temperature changer carrying out the heat transfer medium leaving temperature control by returning the heat transfer medium leaving temperature of the first heat source machine to a pre-change value, when a load factor of the first heat source machine predicted based on a supposition that the heat transfer medium leaving temperature of the first heat source machine is returned to the pre-change value is smaller than a first underload stop threshold value at which the first heat source machine would, have an underload stop.

19. The heat source system controlling device according to claim 3, comprising:
the heat transfer medium leaving temperature changer carrying out the heat transfer Medium leaving temperature control by returning the heat transfer medium leaving temperature of the first heat source machine to a pre-change value, when a load factor of the first heat source machine predicted based on a supposition that the heat transfer medium leaving temperature of the first heat source machine is returned to the pre-change value is smaller than a first underload stop threshold value at which the first heat source machine would have an underload stop.

20. The heat source system controlling device according to claim 4, comprising:
the heat transfer medium leaving temperature changer carrying out the heat transfer medium leaving temperature control by returning the heat transfer medium leaving temperature of the first heat source machine to a pre-change value, when a load factor of the first heat source machine predicted based on a supposition that the heat transfer medium leaving temperature of the first heat source machine is returned to the pre-change value is smaller than a first underload stop threshold value at which the first heat source machine would have an underload stop.

\* \* \* \* \*